United States Patent Office 3,390,699
Patented July 2, 1968

3,390,699
PNEUMATIC STORAGE DEVICE WITH AUTOMATIC CONTROL SYSTEM FOR PNEUMATIC MACHINES
Robert Jurjevich Fedoseev and Iosif Abelevich Barkan, Moscow, U.S.S.R., assignors to Nauchno-Issledovatelsky Institute Teploenergeticheskogo priborostroenija, Moscow, U.S.S.R.
Filed Mar. 11, 1965, Ser. No. 439,019
5 Claims. (Cl. 137—609)

ABSTRACT OF THE DISCLOSURE

A pneumatic storage device is provided having a bellows connected by a spring with a shaft which passes between clamping rollers one of which is connected to a worm gear having a manual control. Another of the clamping rollers is connected by a lever to a follower roller engaged against the surface of a cone connected to a diaphragm which is responsive to an input pressure. The input pressure displaces the cone, whereupon the roller is adjusted to control the related clamping roller. The input pressure is also fed to a three-diaphragm valve connected to an output line and further connected to a second input pressure and to a control valve. The control valve is also connected to a single diaphragm valve which is connected via a flexible line to a nozzle in the bellows controlled by a ball in turn controlled by the aforesaid shaft.

The present invention relates to automatic control and adjustment devices with pneumatic multi-channel regulators, optimizers and control machines and, in particular, it relates to pneumatic storage devices.

There is known a pneumatic storage device comprising a pneumatic mechanical storage unit with bellows, the movable base thereof incorporating a nozzle, a rod connected to the bellows base by a spring, said rod having at one end a ball serving as a choke, whereas the other end of the rod is clamped by a collet-type mechanism, the latter clamping or releasing said rod under the action of a bushing connected with a diaphragm actuated by a control pressure.

The pneumatic mechanical storage unit is connected to an inverter which is, for instance, a single-diaphragm double-contact relay in combination with pneumatic resistors (throttles), or which is a three-diaphragm double-contact relay.

The disadvantage of the above device is that it does not permit a change of the pressure being stored.

There are known special devices designed for varying the pressure, such as setters, by means of which the program for an automatic control system is set or the position of the actuating mechanism is varied.

The known setters are made as a case divided into several chambers. The setting is adjusted by means of a knob connected to a spring. With a change in the value of the spring compression, the choke changes its position relative to the nozzle connecting the neighboring chambers, due to which pressure varies in all chambers of the setter as well as at the output thereof.

If the control is performed manually, the signal from the output of the setter is transmitted directly to the actuating mechanism.

The disadvantage of the above setter is the complexity of the operator manipulations. Before shifting to manual control of the actuating mechanism, the operator should set the switch of the control station to the intermediate position to equalize the pressure at the output of the setter against that in the line of the actuating mechanism, then turn the switch of the station to position and, further, operate the process manually. This does not allow the operator to control the process of adjustment effectively.

An object of the present invention is to eliminate the disadvantages mentioned above.

Another object of the invention is to provide a pneumatic storage device enabling variation of the pressure being stored.

It is still another object of the invention to provide a pneumatic storage device which will make it possible to obviate adjustment and auxiliary operations while resetting the device from the tracing mode to the index value storing mode.

According to the above-mentioned and other objects the invention consists of a pneumatic storage device comprising a pneumatic mechanical storage unit, an inverter connected to the nozzle line of the storage unit, a three-diaphragm double-contact relay communicating through the control pressure line with the storage device, and a mechanism for varying the pressure being stored, said mechanism operating the storage device.

The pneumatic storage unit comprises a bellows-type sensitive element, whose movable base accommodates a nozzle with a ball; a rod resting on the ball and sliding between guide rollers; a swinging lever hinged by one of its ends to the casing of the setter, and by its other end connected to a cone fixed on a spring-mounted rod resting on a diaphragm serving to receive the control pressure.

The mechanism for varying the pressure being stored is made as a worm drive connected with the knob of manual control. Fixed on the worm wheel shaft is a roller which is in touch with the storage unit.

Other objects and advantages of the invention will be more apparent from the following detailed description and the accompanying drawings wherein:

Figures 1, 2:
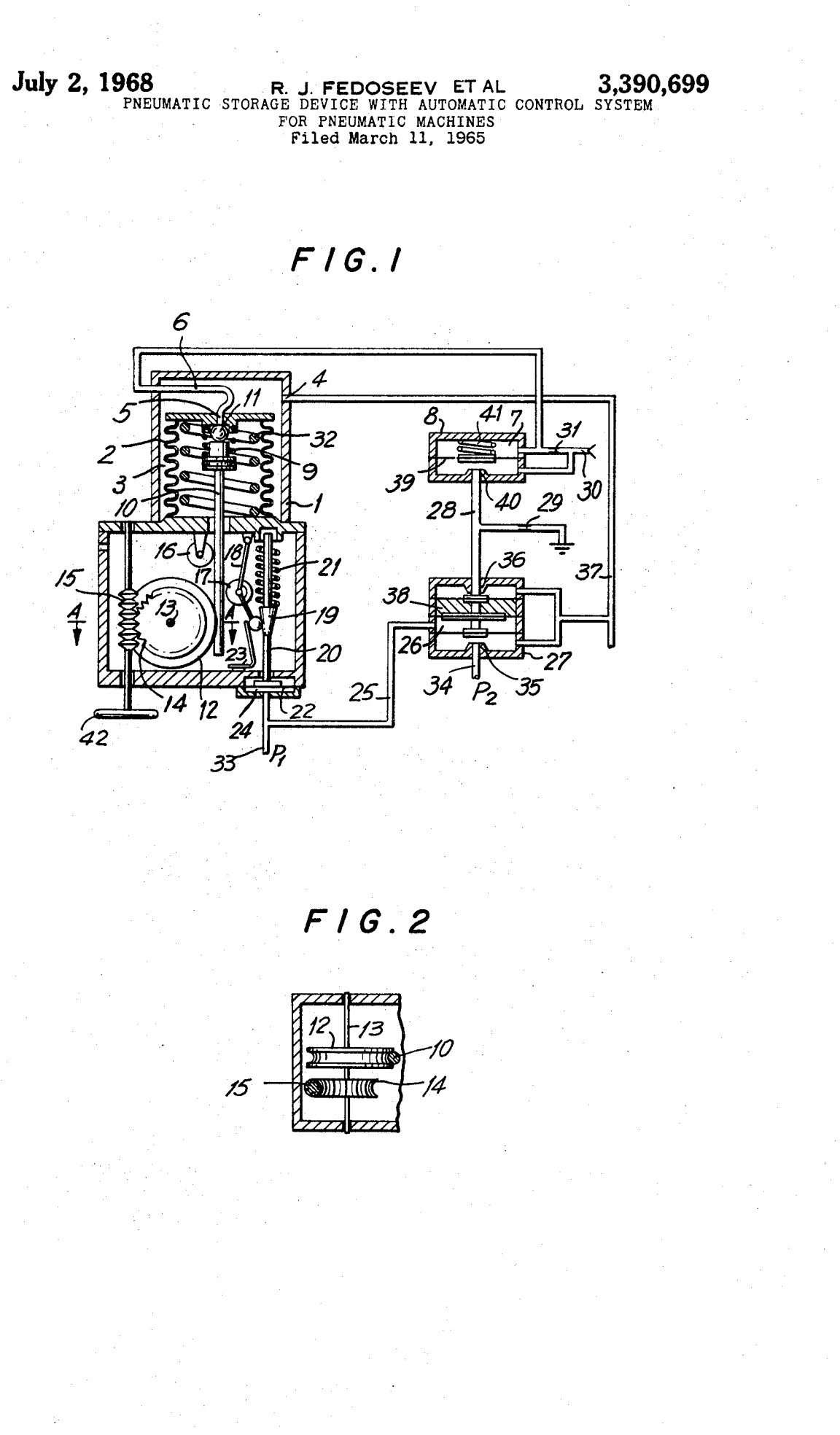

FIG. 1 is a diagram of the proposed device; and
FIG. 2 is a section on line A—A of FIG. 1.

The storage device (FIG. 1) comprises casing 1 forming, together with bellows 2, hermetically sealed chamber 3 with an outlet through union 4. Nozzle 5 communicating through flexible pipe 6 with control chamber 7 of inverter 8 is provided in the base of bellows 2. Rod 10 with ball 11 positioned at an end thereof and serving as a choke for nozzle 5 is connected to the base of bellows 2 by means of spring 9. The rod passes between guide rollers 16 and 17 and roller 12, the latter being secured on shaft 13 of worm wheel 14 (FIG. 2) which is in mesh with worm 15. Roller 17 is secured on swinging lever 18 hinged by one of its ends to casing 1, and by the other end connected to cone 19 fixed on rod 20. From one end, rod 20 is actuated by spring 21, and from the other end by pressure, say air pressure, through diaphragm 22. Spring 23 serves to turn swinging lever 18 away from rod 10 and to press it against cone 19.

Chamber 24 positioned under diaphragm 22 is connected via air line 25 with chamber 26 of three-diaphragm double-contact relay 27.

Relay 27 is connected with inverter 8 through air line 28 which, in its turn, is connected with the ambient air through throttle 29. The air is delivered through line 30 and throttle 31 to the line of nozzle 5 and to inverter 8.

Positioned inside bellows 2 is feedback spring 32.

The device can operate in two operating modes: in the command tracing mode and in the mode of the command proper. Described hereinafter are both modes.

Command tracing mode of operation. Assume, for example that pressure $P_1$ in line 33 is equal to 1.4 kg.-f./sq. cm. In this case, the device operates in the mode of tracing control pressure $P_2$ in line 34. Under the action of pressure $P_1$ diaphragm 22 is urged inwardly and rod 20 travels upwards. Under the action of spring 23, lever 18 turns, moving roller 17 away, thus releasing piston rod 10 which, under the action of spring 9, presses ball 11 against nozzle 5 located in the base of the bellows. Thus, in line 6 there appears a pressure characterized by the stress of spring 9, the area of the working surface of ball 11, by throttle 31 and by pressure supplied to line 30. By the tension of spring 9, pressure in line 6 is set equal to 1.2 kg.-f./sq. cm., irrespective of the position of the base of bellows 2 in relation to casing 1.

The diaphragm set of relay 27 changes its position under the action of pressure $P_1$ in line 33.

Nozzle 35 becomes open, whereas nozzle 36 is closed. Line 34 becomes connected with outlet line 37 and through union 4 with chamber 3. Depending upon pressure $P_1$ in line 33, the rigidity of bellows 2 and the strength of spring 32, the bellows-spring system along with rod 10 travels and takes a certain position in relation to casing 1. The higher pressure $P_2$ is in line 34, the greater is the distance which the bellows-spring system travels. The distance of travel depends upon the rigidity of the flexible coupling of pipe 6, as well as upon the tension of rod 10 in the guide rollers. Inverter 8 may occupy any position, as in the described operating mode it does not affect the operation of the setter. Thus, with any changes of pressure $P_2$ in line 34 the output pressure in line 37 will be equal to $P_2$, and the bellows-spring system will take a position corresponding to said pressure.

Command mode of operation. Assume, that pressure $P_2$ in line 34 and, consequently, in line 37 and in chamber 3, is equal to 0.6 kg.-f./sq. cm. at $P_1$ equal to 1.4 kg.-f./sq. cm. When pressure $P_1$ in line 33 becomes equal to zero, rod 20 under the action of spring 21 will travel downwards, and swinging lever 18 operating through roller 17 will press rod 10 against rollers 12 and 16, thereby fixing the position of the rod and, consequently, the position of the bellows-spring system. Under the action of bearing pressure created in chamber 38 of relay 27, the diaphragm set of the latter will change its position, nozzle 35 is closed and nozzle 36 is opened, as a result of which line 37 will become connected with line 28. If the pressure in outlet line 37 varies, then the bellow-spring system starts to travel relative to clamped rod 10.

Simultaneously, when the pressure in line 37 decreases, the bellows travels upwards and nozzle 5 opens. The pressure in line 6 starts to decrease, diaphragm 39 of inverter 8 opens nozzle 40, and supply line 30 becomes connected with outlet line 37 and chamber 3 of bellows 2. The pressure in line 37 and in chamber 3 will start to rise, until bellows 2 approaches rod 10 and nozzle 5 becomes closed by ball 11. Then the pressure in line 6 increases until diaphragm 39 of inverter 8 closes nozzle 40 to such an extent that the pressure in line 37 becomes equal to 0.6 kg.-f./sq. cm. If the pressure in line 37 exceeds 0.6 kg.-f./sq. cm., bellows 2 will approach rod 10 and nozzle 5 will be completely closed, which will bring about an increase of pressure in line 6 up to the level of pressure in supply line 30, as diaphragm 39 is actuated not only by the supply pressure from both sides, but by spring 41 as well. Nozzle 40 becomes closed. If nozzle 40 is closed, the air from line 28 and line 37 escapes through throttle 29 into the ambient air. The pressure in line 37 and in chamber 3 will be decreasing (tending to fall down to zero). The pressure in line 37 will be decreasing, until nozzle 40 is closed. As soon as the pressure in line 37 is less than 0.6 kg.-f./sq. cm., bellows 2 will move away from rod 9, and nozzle 5 will become open. The pressure in line 6 decreases and diaphragm 39 opens nozzle 40. Supply line 30 becomes connected with line 28 which, through relay 27, is connected with line 37 and chamber 3. The pressure in line 37 and in chamber 3 will start to rise due to supply of air, until bellows 2 approaches rod 10. At the moment bellows 2 approaches rod 10, nozzle 5 becomes closed and the pressure in line 6 will rise, until diaphragm 39 closes nozzle 40 to such an extent that the pressure in line 37 becomes equal to 0.6 kg.-f./sq. cm. Thus, a conventional closed dynamic system with the back pressure line is formed. By turning knob 42, one can vary the pressure in line 37 from zero up to the level of supply pressure. Roller 12 secured on the shaft of worm couple 14–15 draws, due to friction, rod 10 which is followed up by the bellows-spring system. By displacing rod 10, it is possible to bring the bellows-spring system to a condition at which the spring tension will be minimum or maximum, or to any intermediate state. As the pressure in chamber 3 and in line 37 depends upon the tension of spring 32 and bellows 2, the pressure in line 37 can be varied from zero up to the supply pressure level.

In the above, the three-diaphragm double-nozzle valve 27 is an element capable of commutating the lines in the illustrated construction. Chamber 38 of the valve 27 communicates with a constant-pressure source which maintains a pressure exceeding the lowest level of the command pressure $P_1=0$ but is below the highest level of this pressure $P_1=1$. Therefore, valve 27 is capable of assuming two steady positions under different values of the pressure $P_1$. With $P_1=0$, nozzle 35 is closed, while nozzle 36 is open. With $P_1=1$, nozzle 36 is closed and nozzle 35 is open.

Valve 8 consists of a casing divided by diaphragm 39 into two chambers, one overlying the diaphragm and communicating with nozzle 5 provided on bellows 2 and the other underlying the diaphragm and communicating with supply line 30.

The opening and closure of nozzle 40 is effected by the forces acting upon diaphragm 39.

Since the only variable is the pressure in the chamber overlying the diaphragm, a change in this pressure results in a change in flow from supply line 30 to line 28.

Spring 9 is rigidly attached with its one end to the movable base of bellows 2 and with the other it is rigidly coupled to shaft 10.

The inner chamber of bellows 2 opens up into the atmosphere.

Roller 17 forces shaft 10 against rollers 16 and 12 when casing 19 is in the lowermost position. However, when casing 19 rises, spring 23 withdraws lever 18 with roller 17 from shaft 10.

$P_2$ is a command pressure capable of assuming two values —0 and 1 (0 is atmospheric pressure and 1 is 1 kg. sq. cm.). $P_2$ is a setting pressure changing gradually within the range of 0 to 1 kg. sq cm.

The pressure in line 30 is constant and serves as supply pressure. The pressure in line 37 is output pressure, depending either on pressure $P_2$ (when nozzle 35 of valve 27 is open) or on pressure in line 28 (when nozzle 36 is open).

Supply line 30 communicates with line 37 when nozzle 40 of valve 8 and nozzle 36 of valve 27 are open.

While the invention has been described in connection with the preferred embodiment thereof, various alterations and modifications may be made without departing from the spirit and scope of the present invention, as those skilled in the art will readily understand.

These alterations and modifications are considered to be falling within the spirit and scope of the present invention and the appended claims.

What is claimed is:

1. A pneumatic storage and relay device comprising: a casing, a bellows mounted thereon at one end, a movable base carried by the other end of the bellows, means defining a closed pressure chamber with the exterior of the bellows; a nozzle carried by said base communicating a fluid pressure line with the bellows interior, a shaft extending through the casing, valve means cooperating with one end of said shaft for variably throttling the nozzle, means biasing the shaft and valve means toward the nozzle, clamping means defined by a plurality of pressure rollers for locking said shaft against movement, fluid pressure responsive diaphragm means and spring loaded means for actuating said clamping means to lock said shaft upon depressurizing of said diaphragm means to unlock said shaft upon pressuring of said diaphragm means, means including a worm gear cooperating with one of said rollers for manually moving said shaft when said clamping means is in locking position; a three diaphragm relay valve comprising: a casing having an inlet nozzle connected to a source of pressure, an exhaust nozzle connected through a restriction to atmosphere, an output line, three diaphragm valve means defining a control pressure chamber, a biasing pressure chamber and a pair of valve elements cooperating with the inlet and exhaust nozzle, the arrangement being such that the inlet nozzle is connected to the output line while the exhaust nozzle is disconnected from the output line when the pressure in the control chamber exceeds the pressure in the biasing chamber, and the inlet nozzle is disconnected from the output line while the exhaust nozzle is connected to the output line when the pressure in the biasing chamber exceeds the pressure in the control chamber; means for connecting a source of biasing pressure to both the biasing pressure chamber of the relay valve and the first mentioned diaphragm means; means for connecting the output line of the relay valve to the chamber exterior of the bellows; an inverter valve comprising: a housing divided into two chambers by a diaphragm, valve means carried by the diaphragm, an outlet nozzle extending into one of the chambers with which the valve means cooperates, means biasing the valve means against the outlet nozzle, means for connecting a source of fluid pressure to said one of the chambers directly and through a restriction to said other chamber; means for connecting the outlet nozzle of said inverter to the exhaust nozzle of said relay valve; and means for connecting said other chamber of said inverter to the fluid pressure line communicating with the nozzle of the bellows.

2. A device as claimed in claim 1, wherein the spring-loaded means includes a cone against which said pressure roller means operates.

3. A device as claimed in claim 2, wherein said pressure roller means includes a roller operating against said cone and a lever connected between the latter said roller and one of the rollers of said clamping means.

4. A device as claimed in claim 3 comprising a spring in said bellows encircling said shaft and opposing collapsing of said bellows.

5. A device as claimed in claim 3 comprising a control means for manually adjusting said worm gear.

References Cited
UNITED STATES PATENTS
2,701,576   2/1955   Higgins _____ 137—84

ALAN COHAN, *Primary Examiner.*